United States Patent [19]

Mikami

[11] 3,742,471

[45] June 26, 1973

[54] BUBBLE DOMAIN APPARATUS

[75] Inventor: Itsuo Mikami, Tokyo, Japan

[73] Assignee: Hitachi, Ltd., Tokyo, Japan

[22] Filed: Feb. 24, 1972

[21] Appl. No.: 228,899

[30] Foreign Application Priority Data

Feb. 24, 1971 Japan .................................. 46/8648

[52] U.S. Cl. 340/174 S, 340/174 HA, 340/174 PM, 340/174 TF

[51] Int. Cl. .............................................. G11c 11/14

[58] Field of Search ............... 340/174 TF, 174 PM, 340/174 S

[56] References Cited

UNITED STATES PATENTS 3,678,478 7/1972 Copeland ......................... 340/174 S

*Primary Examiner*—James W. Moffitt
*Attorney*—Thomas E. Beall, Jr.

[57] ABSTRACT

Bubble domain apparatus comprising a plurality of bubble domain elements, each of which has a bias magnetic field applied thereto by a permanent magnet sheet having an equivalent diameter sufficiently large relative to its thickness and being magnetized normally to the sheet surface, and which are received in a magnetic shielding box so that the permanent magnet sheets may be in parallel arrangement. In the bubble domain apparatus, even when one of said bubble domain elements is taken out from said apparatus, the bias magnetic fields applied to the respective bubble domain elements change scarcely.

3 Claims, 4 Drawing Figures

BUBBLE DOMAIN APPARATUS

FIELD OF THE INVENTION

The present invention relates to bubble domain apparatus, and more particularly to bubble domain apparatus wherein a plurality of bubble domain elements having the function of memory or logic is received in a magnetic shielding box.

BACKGROUND OF THE INVENTION

The bubble domain element includes as the main constituent a magnetic sheet made of the single crystal of a rare earth orthoferrite, iron garnet, etc. having the direction of easy magnetization normally to the sheet surface, and has the function of memory, logic, etc. in such way that the presence and absence of a bubble domain (hereinafter, simply termed "bubble") appearing through the sheet surfaces when a suitable bias magnetic field is applied normally to the sheet surface of the magnetic sheet are brought into correspondence to "1" and "0." In order that the magnetic sheet may effect such function, there are additionally required a bubble generator, a bubble shift circuit, a bubble eater, a bubble detector, electric circuitry for driving and controlling them, and so forth. Part of the electric circuitry may be composed of some IC (integrated circuit) active elements. Further, in order to generate the bubble domain within the magnetic sheet as described above and to stably hold it, there is required means to apply a bias field. Yet further, in some cases, means to apply a rotating field or alternating field within the plane of the magnetic sheet is also required in order to shift or transfer the bubble. While a coil may be employed as the bias field applying means, it is more desirable for simplicity of the apparatus to use a permanent magnet sheet which is magnetized normally to the sheet surface.

The bubble generator, bubble shift circuit, bubble eater, bubble detector and the IC active elements operable in association with them, etc. are constituted on a substrate by utilizing, e. g., the multilayer wiring technics used in the manufacture of semiconductor IC, which substrate consists of the permanent magnet sheet itself or of the permanent magnet sheet having a non-magnetic insulating plate closely stuck thereon. Further, the magnetic sheet is stuck to a predetermined position on the wired circuitry. Then, the bubble domain element having the function of memory or logic of certain capacity is obtained. The element shall be herein termed the "plane." The plane becomes one constitutional unit of bubble domain apparatus of large capacity. In order to increase the spatial density, a number of planes are piled up into an aggregate. This shall be herein called the "stack." A problem of the plane having the permanent magnet sheet as described above, is that, when a number of planes are piled up to assemble the stack, the strengths of the bias fields applied to the magnetic sheets generally vary due to mutual influences. Further, it is sometimes necessary, to shift bubble domains, to apply rotating fields or alternating fields to the stack. When, in order to raise the efficiency of these fields, the whole stack is incorporated together with the field generaring coil into a box made of a magnetic material, such as ferrites, having high permeability and being small in high-frequency loss and it is thus magnetically shielded, the variation in the bias field still more increases between a case where one plane is independently present and a case where it is incorporated into the magnetic shielding box so as to constitute the stack.

An advantage of the construction in which, in case of independently taking out one plane from among the stack, each bias field is kept applied to the individual plane, is that the particular plane may be taken out without destroying the arrangement of bubble domains and that the inspection, exchange, etc. of the plane become extremely easy. In the general case, however, there is a disadvantage that the bias field by the permanent magnet sheet varies, as described above, between the case where the plane is singly present and the case where it is combined into the stack.

An object of the present invention is to provide bubble domain apparatus wherein, in case of assembling into a magnetic shielding box an aggregate (termed "stack") of bubble domain elements (termed "planes") each of which has a bias magnetic field applied thereto by a permanent magnet sheet magnetized normally to the sheet surface, the bias fields applied to the individual planes scarcely change between cases where the plane is singly present and where the planes are assembled in the stack to be received into the magnetic shielding box.

SUMMARY OF THE INVENTION

The present invention consists in that a plurality of bubble domain elements are arranged in parallel in a magnetic shielding box at spacings to the extent of exerting no influence upon one another, said bubble domain elements each having a bias field applied thereto by a permanent magnet sheet which is sufficiently large in the longitudinal and lateral dimensions of the sheet surface relative to the thickness and which is magnetized normally to the sheet surface.

DETAILED DESCRIPTION OF THE INVENTION

Figure 1:
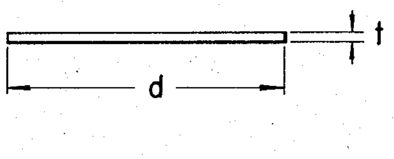
FIG. 1 is a side view of a permanent magnet sheet used in the present invention.

The principle of the present invention will first be explained with mathematical expressions. When a disc-shaped permanent magnet sheet or substrate of a diameter $d$ and a thickness $t$ as shown in FIG. 1 is magnetized in the direction normal to the sheet surface, a magnetic field $Hb$ at a point in close proximity in the normal direction is represented by the following expression:

$$Hb = B = (1 - N') 4\pi M \tag{1}$$

where $B$ indicates the magnetic flux density within the permanent magnet substrate, $N'$ the demagnetizing factor N of said substrate in the direction normal to the sheet surface as is divided by $4\pi$, and $M$ the magnetization thereof.

In case where the disc of the disc-like permanent magnet substrate may be approximated by a spheroid, $N'$ may be easily derived (refer, for example, to Physical Review, volume 67, page 351 (1945)), and $Hb$ becomes as follows:

$$Hb = 1/(m^2-1)\left\{m^2/\sqrt{m^2-1}\ \text{arc sin}\ [\sqrt{m^2-1}/m] - 1\right\}4\pi M \quad (2)$$

where $m = d/t$, $d$ indicates the diameter of the disc, and $t$ the thickness thereof.

Figure 2:
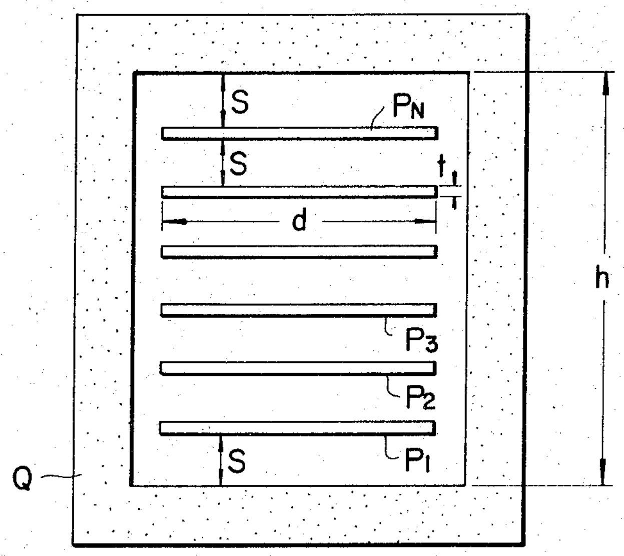
FIG. 2 is a schematic view of bubble domain apparatus of the present invention as is illustrated only with the array of the permanent magnet sheets.

Next, consider a case where, as shown in FIG. 2, $n$ permanent magnet substrates $P_1, P_2 \ldots P_N$ are contained in a ferrite shielding box Q of an inside height $h$ in manner to be parallel to one another and to be spaced by intervals S. In this case, assume that the magnetic permeability $\mu$ of the shielding ferrite be high enough to be regarded as being infinite in comparison with that of the permanent magnet sheet ($\mu \approx 1$). In addition, assume that the magnetic flux within the shielding box consist only of the normal component, and that it circulate in the ferrite. By solving Maxwell's equations:

$$\text{div}\ B = 0 \quad (3)$$

$$\oint H\, ds = 0 \quad (4)$$

(where $B$: magnetic flux density, $H$: magnetic field), the magnetic field $Hb$ between the adjacent permanent magnet substrates becomes as in the following expression:

$$Hb = t/(h/n)\ 4\pi M \quad (5)$$

where, as in the foregoing, $h$ indicates the inside height of the shielding box Q, $n$ the number of the permanent magnet substrates, and $t$ the thickness of each permanent magnet substrate.

Assuming that there be used a permanent magnet material hard enough to allow no change in the value of magnetization between the case where a single permanent magnet substrate is present and the case where $n$ substrates are received in the shielding box, the condition under which the bias field provided by the permanent magnet substrate does not change between the single case and the case of incorporation into the shielding box is that the expressions (2) and (5) are equal. From both the expressions, the condition becomes as follows:

$$t/(h/n) = 1/(m^2-1)\ [m^2/\sqrt{m^2-1}\ \text{arc sin}\ (\sqrt{m^2-1}/m) - 1] \quad (6)$$

Figure 3:
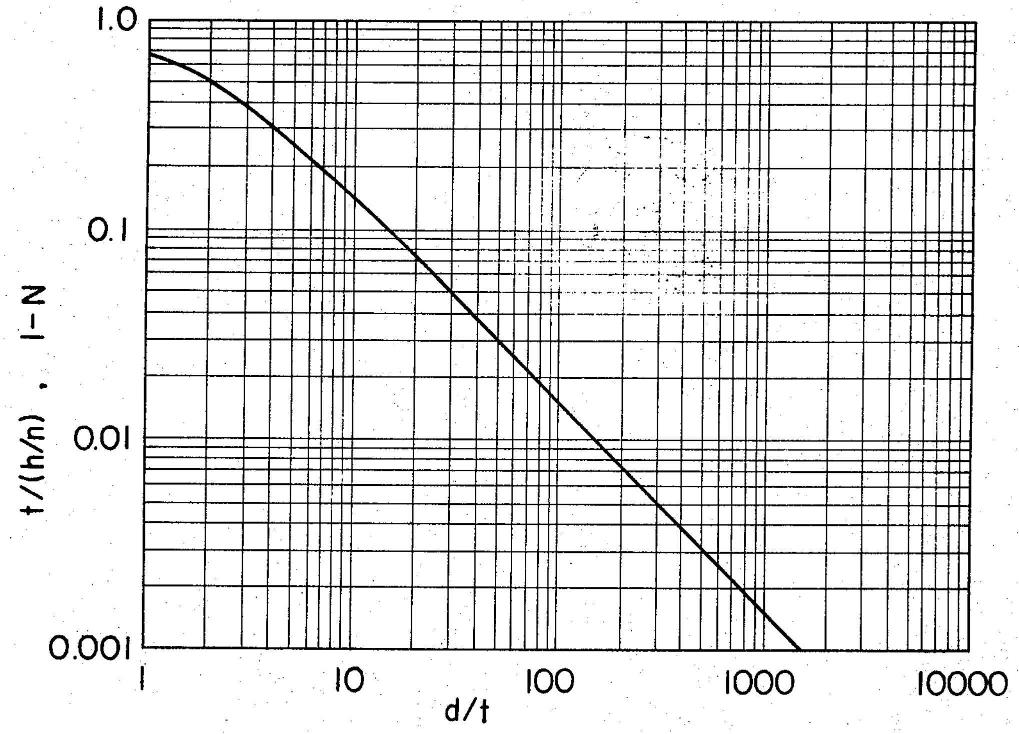
FIG. 3 is a curve diagram showing the relation between the dimensions of the permanent magnet sheet and those of a magnetic shielding box in the apparatus in FIG. 2.

FIG. 3 is a diagram which illustrates the relation between $t/(h/n)$ and $d/t$ as fulfills the expression (6). If the dimensions (particularly, the height $h$) of the shielding box, the number of the planes or the permanent magnet substrates, and the ratio between the diameter and the thickness of the permanent magnet sheet are substantially close to the relation indicated by the expression (6) and illustrated in FIG. 3, then the value of the bias field does not vary between the case where a single permanent magnet substrate is present and the case where a number of substrates are received in stack in the shielding box.

When $m >> 1$, the expression (6) is reduced to a simple form as follows:

$$t/(h/n) = \pi/2(t/d) - 2(t/d)^2 \quad (7)$$

$$\approx \pi/2(t/d) \quad (8)$$

That is, the relation between $h$ and $d$ is approximated to the following expression:

$$h \approx (2/\pi)nd \quad (9)$$

In many cases, it is not necessary to satisfy the expression (6). If the expression (9) is fulfilled, the value of the bias field is not changed.

Figure 4:
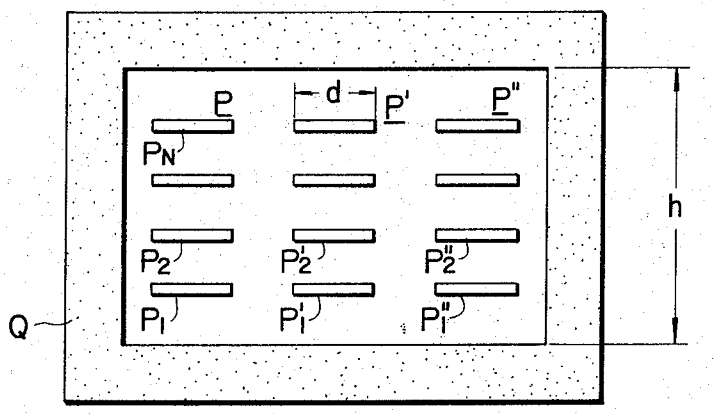
FIG. 4 is a schematic view of another embodiment of the bubble domain apparatus of the present invention.

As apparent from the expression (9), $(h/n)$ is approximate to $d$, and $(h/n)$ is substantially equal to the distance between the adjacent permanent magnet substrates. As a consequence, in case of using permanent magnet substrates of large diameter, the distance between the adjacent permanent magnet substrates, i. e., that between the adjacent planes is large, and hence, the filled density into the shielding box may not be raised. The results of experiments have revealed that the variation in the bias field between the case of the single permanent magnet substrate and the case of assembling the stacks and receiving them into the shielding box may also be reduced in case where, as illustrated in FIG. 4, the diameter $d$ of permanent magnet substrates $P_1$, $P_1'$, $P_2''$ etc. is made small, the height $h$ of the shielding box Q is determined so as to fulfill the expression (9) with respect to the dimensions, yet the width thereof is made sufficiently large, and some stacks, for example, P, P' and P'' are received at suitable spacings into the identical shielding box Q. The distance by which the adjacent stacks may come close to each other, differs depending on the diameter, thickness etc. of the permanent magnet sheets.

The magnetic permeability of the actual ferrite shielding box is not infinite, but is finite. For this reason, even if the value of the height $h$ of the shielding box is chosen to be smaller than that determined by the expression (9), the object of the present invention may be satisfactorily accomplished.

The value of the bias field to be applied to the single-crystal magnetic sheet for the bubble domain element may be set at a predetermined one (for example, approximately 30 Oe for a thulium orthoferrite sheet) on condition that the value of the residual magnetization of the permanent magnet material employed is made an appropriate one thereby fulfilling the expression (6). Preferable is a material in which, after magnetization, the value of the residual magnetization is not easily changed, that is to say, a material in which the magnetic field nullifying its magnetization $M$, i. e. the coercive force $H_C'$, is high. Extremely good substances as such materials are strontium ferrite aluminate ($SrAl_xFe_{12-x}O_{19}$), barium ferrite aluminate ($BaAl_xFe_{12-x}O_{19}$), etc. since the value of saturation magnetization at room temperature may be varied to an optional one from 5,000G to 0 by varying the additional quantity of Al, and since $H_C'$ is remarkably raised by varying the additional quantity of Al. Moreover, when it is desired to join the permanent magnet sheet with an alumina sheet, the bonding property is good, and they are also preferable in this sense.

In case of taking out only one from among a number of permanent magnet substrates incorporated into the shielding box, if the relation of the expression (6) is established, the bias field of the permanent magnet substrate taken out does not change. The bias fields within the shielding box, however, generally change slightly. When the number $n$ of the permanent magnet substrates is large, the changes are small. In practical use, there is not raised any obstruction in such a way that a preparatory permanent magnet substrate is separately provided, and that, simultaneously with taking out one substrate, the preparatory permanent magnet substrate is inserted.

While, in the above, description has been made of the disc-shaped permanent magnet substrate, little different results are obtained also in case of rectangular substrates such that the expression (6) is applied with the average length of one side regarded as corresponding to the diameter of the disc (said length shall be termed the "equivalent diameter"). In short, it is required that the dimensions of the surface of the substrate be sufficiently large relative to the thickness thereof.

As apparent from the foregoing explanation, the present invention has remarkably increased the applicability of the permanent magnet substrate, and is greatly effective.

Hereinbelow, the present invention will be described in detail in conjunction with examples.

EXAMPLE 1

Polycrystal sintered bodies of strontium ferrite and barium ferrite respectively added with aluminum were prepared. The saturation magnetization at room temperature was approximately 500G in both the bodies. Discs of a diameter of 15mm and a thickness of 1mm were cut out from the specimens, and both surfaces of each disc were polished. Thereafter, they were magnetized in the direction normal to the surfaces. When the magnetic field of a part directly above the surface was measured, it was approximately 30 Oe.

On the other hand, a magnetic shielding box of outside dimensions of $130mm^3$ and inside dimensions of $100mm^3$ was made of Mn – Zn ferrite of high permeability ($\mu \approx 1,000$). 10 of the above permanent magnet discs were received into the magnetic shielding box such that they are stacked with a spacing of approximately 8mm between the adjacent ones. A Hall element was inserted through a lateral hole having been previously perforated in a side wall of the shielding box, and thus, the magnetic field between the adjacent permanent magnets was measured. Then, it was approximately 30 Oe, which was substantially equal to the magnetic field above the surface in case of the single permanent magnet.

EXAMPLE 2

Into a magnetic shielding box as in Example 1, there were received five sets of permanent magnet sheets similar to those in Example 1, each set consisting of 10 sheets. The magnetic field between the adjacent permanent magnet sheets of each set was measured by a method similar to that in Example 1. Then, as in Example 1, it was substantially equal to the magnetic field formed by the single permanent magnet sheet.

What is claimed is:

1. Bubble domain apparatus, comprising: $n$ pairs of a permanent magnet sheet and a bubble domain element; each of said paired permanent magnet sheet and bubble domain element being stacked in close proximity with each other; each of said bubble domain elements having a magnetic sheet capable of moving bubble domains in its sheet and means for moving bubble domains in its sheet; each of said permanent magnet sheets having an equivalent diameter of d and a thickness of t wherein said d and said t are selected to fulfill the condition of $d/t >> 1$ and being magnetized normally to its sheet surface for applying a bias magnetic field to said magnetic sheet being paired with said permanent magnet sheet; a magnetic shielding box having an inside height of h; and said n permanent magnet sheets being stacked in parallel and fixed spaced apart relationship with respect to one another by distances which fulfill the condition of $h/n \approx 2d/\pi$ in said magnetic shielding box above and below.

2. Bubble domain apparatus according to claim 1, in which said n stacked permanent magnet sheets are further arranged in said magnetic shielding box right and left.

3. Bubble domain apparatus according to claim 1, in which said n stacked permanent magnet sheets are further arranged in said magnetic shielding box right, left, before and behind.

* * * * *